UNITED STATES PATENT OFFICE.

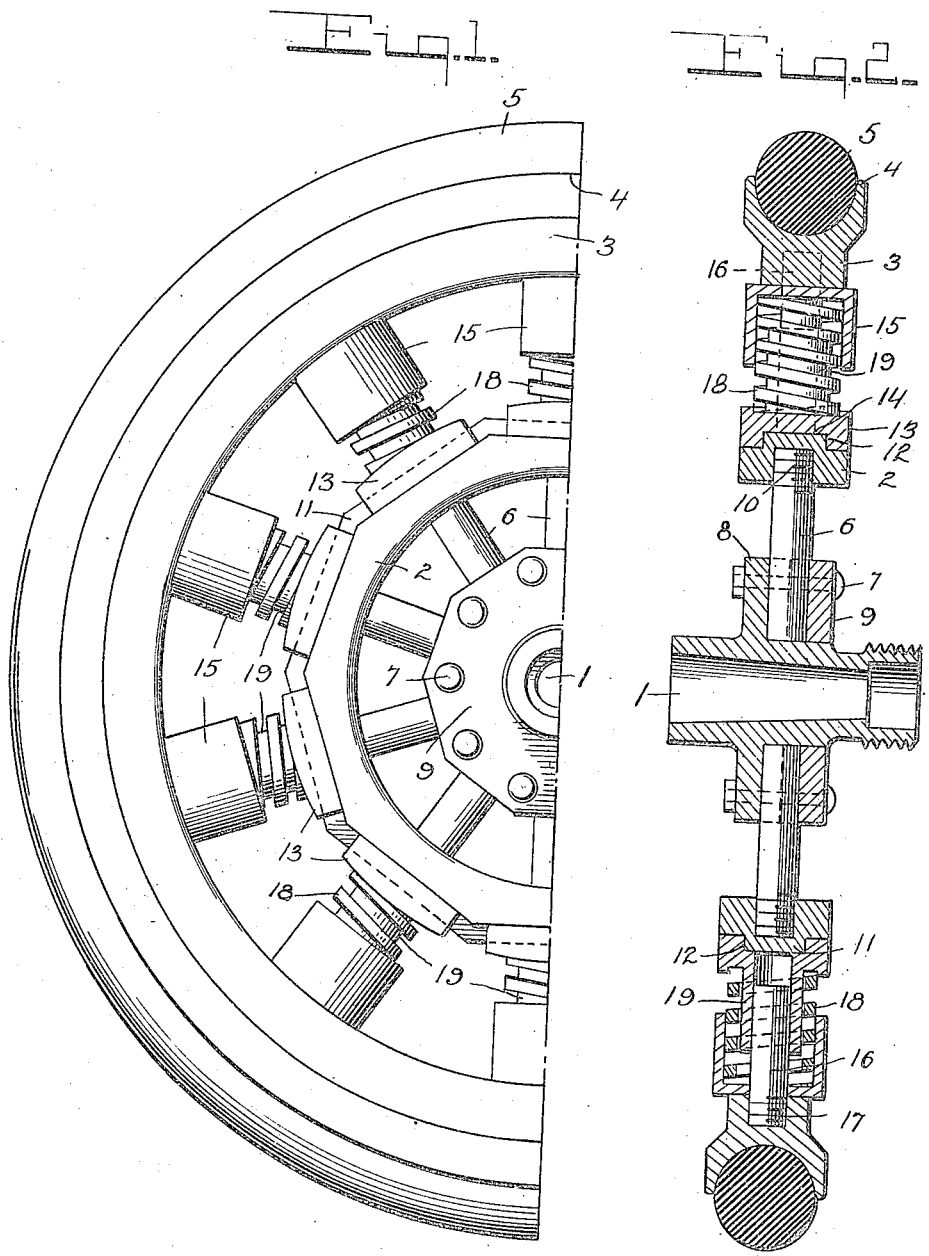

LAURENCE B. FRAHN, OF NEW DECATUR, ALABAMA, ASSIGNOR OF ONE-HALF TO JOSEPH W. FRAHN, OF NEW DECATUR, ALABAMA.

SPRING-WHEEL FOR AUTOMOBILES.

1,254,492.     Specification of Letters Patent.     Patented Jan. 22, 1918.

Application filed May 19, 1915. Serial No. 29,241.

*To all whom it may concern:*

Be it known that I, LAURENCE B. FRAHN, a citizen of the United States, residing at New Decatur, in the county of Morgan and State of Alabama, have invented certain new and useful Improvements in Spring-Wheels for Automobiles; and I do hereby declare the following to be a full, clear, and exact description of the invention, such as will enable others skilled in the art to which it appertains to make and use the same.

This invention is an improved spring wheel for use on automobiles and other like vehicles, the object of the invention being to provide an improved wheel of this character which is simple in construction, is strong and durable, is not likely to get out of order and which enables a pneumatic tire to be dispensed with.

The invention consists in the construction, combination and arrangement of devices hereinafter described and claimed.

In the accompanying drawings:—

Figure 1 is an elevation of a portion of a spring wheel constructed in accordance with my invention.

Fig. 2 is a central sectional view of the same.

My improved spring wheel has a hub 1, an inner rim 2 and an outer rim 3. The outer rim is peripherally channeled as at 4 to receive a solid tire 5. The inner rim is connected to the hub by short fixed spokes 6. The inner ends of the spokes are here shown as clamped by bolts 7 between the hub flange 8 and a clamping ring 9 and the outer ends of said spokes are shown as screwed into threaded openings in the inner rim as at 10.

The outer side of the inner rim is polygonal in form and provided with angularly related faces 11 each of which has a centrally arranged guide flange 12. Slides 13 bear and are arranged for movement on the angular outer faces of the inner rim and are provided on their inner sides with guide grooves or channels 14 which are engaged by the guide flanges 12 so that said slides are held in place. The said slides are arranged at right angles to and at the outer ends of the spokes 6.

The outer rim 3 is provided on its inner side, at points corresponding with the spokes, with radially arranged cylindrical spring seats 15, the inner ends of which are open. Stub spokes 16 are also provided which are concentric with and extend through the spring seats and have their outer ends screwed as at 17 or otherwise suitably secured to the outer rim. Springs 18 of suitable size and strength, and the coils of which are preferably rectangular in cross section are arranged with their outer ends in the spring seats, their inner ends bearing against the outer sides of the slides and their inner portions extended around guide sleeves 19 with which the slides are provided and in which the spokes 16 are radially movable.

While I have herein shown and described a preferred form of my invention, I would have it understood that changes may be made in the form, proportion and construction of the several parts without departing from the spirit of the invention and within the scope of the appended claim.

Having thus described my invention, I claim:—

A spring wheel comprising a hub, an outer rim, an intermediate rim secured to the hub and having a polygonal perimeter presenting a plurality of angularly related faces, a continuous polygonal rib formed on and located centrally between the side edges of said faces, said rib presenting a plurality of angularly related faces parallel to and longer than said first named faces, grooved slides embracing said rib and engaging the faces on the rib and intermediate rim, said rib holding the intermediate rim and slides against relative lateral movements, means connecting the outer rim to the slides for radial movements with relation thereto, said means holding the outer rim and slides against relative circumferential and lateral movements, and springs mounted on said means between the outer rim and slides.

In testimony whereof I affix my signature in presence of two witnesses.

LAURENCE B. FRAHN.

Witnesses:
R. H. WOLCOTT,
A. C. CAIN.

Copies of this patent may be obtained for five cents each, by addressing the "Commissioner of Patents, Washington, D. C."